United States Patent [19]

Crates

[11] Patent Number: 4,549,822
[45] Date of Patent: Oct. 29, 1985

[54] APPARATUS TO DISTRIBUTE A HIGHLY-PRESSURIZED FLUID MEDIUM

[75] Inventor: Charles A. Crates, Bethel Park, Pa.

[73] Assignee: SMS Schloemann-Siemag, Inc., Pittsburgh, Pa.

[21] Appl. No.: 523,019

[22] Filed: Aug. 15, 1983

[51] Int. Cl.$^4$ ............................................. F01B 31/00
[52] U.S. Cl. ...................................... 384/462; 92/106
[58] Field of Search ...................... 92/106; 308/187 R; 384/322, 397, 398, 399

[56] References Cited

U.S. PATENT DOCUMENTS

| 3,020,057 | 2/1962 | Gamet | 92/106 X |
| 3,417,672 | 12/1968 | Sampson | 92/106 |
| 3,439,925 | 4/1969 | Sampson | 92/106 X |
| 4,168,654 | 9/1979 | Wilson et al. | 92/106 |

FOREIGN PATENT DOCUMENTS 2056608  3/1981  United Kingdom ................. 92/106

*Primary Examiner*—Stuart S. Levy
*Assistant Examiner*—David Werner
*Attorney, Agent, or Firm*—Clifford A. Poff; Thomas H. Murray

[57] ABSTRACT

A distributor is disclosed wherein a stator receives highly-pressurized fluid from a stationary source and delivers the same to spaced-apart annular reservoirs in a rotor. Bores in the rotor conduct the fluid to a rotating piston and cylinder assembly. Bearings support the rotor so that an annular orifice is formed by a gap between hardened face surfaces on the stator and rotor. The spacing between the annular reservoirs is greater than the distance to an adjacent drain reservoir. The drain reservoirs deliver fluid to the bearings for lubrication before the fluid is returned to the stationary source.

7 Claims, 4 Drawing Figures

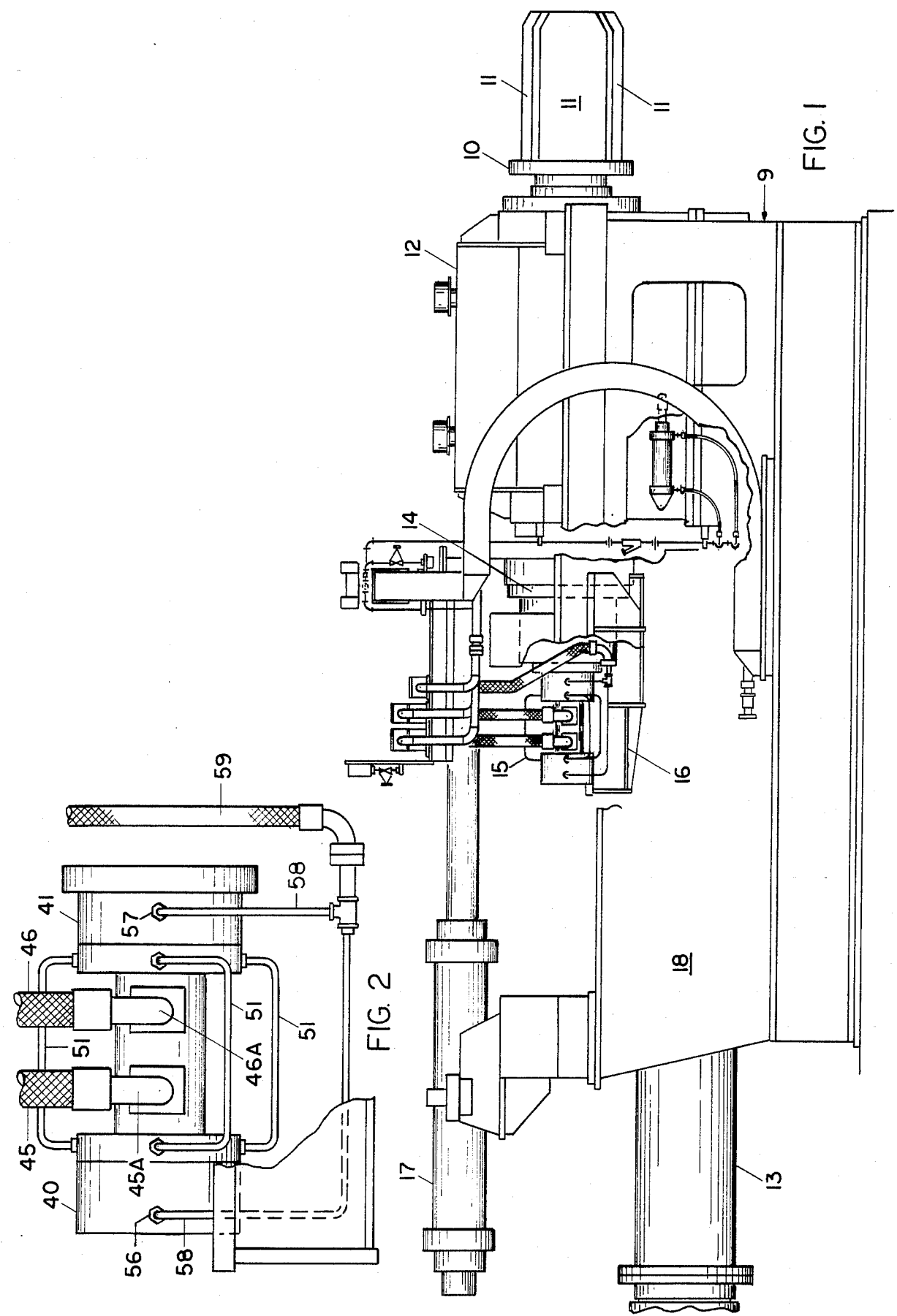

APPARATUS TO DISTRIBUTE A HIGHLY-PRESSURIZED FLUID MEDIUM

BACKGROUND OF THE INVENTION

This invention relates to an apparatus to supply a highly-pressurized fluid medium to a machine element while rotating at a high speed, e.g., 1000 RPM's, from a stationary supply source of pressurized fluid medium. While not so limited, the apparatus of the present invention is particularly useful to supply hydraulic fluid under pressure to an expandable reel used to coil or uncoil metal strip incident to processing in a rolling mill. A piston and cylinder assembly is used to form an actuator in a tension or payoff reel for expanding and collapsing segments of an expandable mandrel. Sometimes in the past, a piston and cylinder assembly used to expand and collapse the segments of an expandable mandrel was connected to the mandrel in a manner such that the piston rotated on the cylinder wall while at the same time a pressurized fluid medium is applied to the piston, causing it to reciprocate along the cylinder wall to expand and collapse the segments of the mandrel. At a high speed of rotation by the mandrel, excessive amounts of heat and wear take place between the piston and the wall of the cylinder. To alleviate this problem, it has been proposed to arrange the piston and cylinder assembly for expanding the segments of the mandrel in a manner such that the entire piston and cylinder assembly rotates with the mandrel. It is necessary to couple the rotating piston and cylinder assembly to a controlled supply of pressurized hydraulic fluid medium from a stationary source. The necessary pressure of the fluid medium to expand the segments of the mandrel is substantial; normally about 1500 psi, but selected according to the design and intended use of the reel.

Mechanical seals that rub on the rotating and/or stationary parts in a device to control the flow of fluid medium between these parts are undesirable to conduct a pressurized fluid medium to a rotating machine element, such as the aforesaid piston and cylinder assembly for a reel. The rubbing action of the seal surfaces generates subtantial amounts of heat that distort these surfaces, particularly at high rotational speeds, e.g., 1000 RPM's or greater. Moreover, the design of the seal must perform in an adverse environment and must be effective against a high working pressure fluid of, for example, 1500 psi.

SUMMARY OF THE INVENTION

It is an object of the present invention to provide an apparatus to distribute a highly-pressurized fluid medium in a manner to obviate the need for mechanical seals and their disadvantages and shortcomings set forth hereinbefore.

It is a further object of the present invention to provide a distributor in which the flow of a highly-pressurized fluid medium occurs between a stator and a rotor while contained by a narrow gap therebetween forming an annular orifice from which a controlled drainage is provided along at least one end thereof for forming an effective containment of the fluid medium.

More particularly, the present invention provides a distributor for a highly-pressurized fluid medium including the combination of a drum-like rotor having a longitudinal bore extending from one end along part of the length thereof and intersecting with a radial rotor bore for conducting the fluid medium, a stator defining a stator bore having a hardened face surface, means including a radial opening in the stator bore for conducting the fluid medium to a portal opening communicating with the stator bore, bearing means supported by the stator at opposite sides of its bore to rotatably carry the rotor such that the radial bore of the rotor moves into a generally-confronting relation with the stator bore for transferring the fluid medium therebetween, the rotor having a hardened rotor face surface forming an annular orifice with the hardened face surface of the stator bore, and drain means for conducting the fluid medium from the annular orifice, the portion of the annular orifice extending to one side of the stator bore being sufficiently greater to substantially prevent the flow of fluid medium therealong as compared with the portion of the annular orifice extending to the other side of the stator bore for delivering the fluid medium to said drain means.

Preferably, the distributor of the present invention is further characterized by providing the stator and the rotor each with two radial bores separate and spaced apart along the annular orifice by a distance substantially greater than the distance along the annular orifice between one of the bores and the drain means. Each stator bore confronts one of the rotor bores as the rotor rotates. Spaced-apart circumferential recesses may be provided in the hardened rotor face surface to form fluid reservoirs by intersecting with the radial bores. More than one radial bore may communicate with each fluid reservoir. The drain means preferably takes the form of a fluid-collecting reservoir, also formed by a circumferential recess in the rotor defining the limits to each of the opposite ends of the annular orifice. The drain means further includes drain ports in the stator to communicate with the fluid-collecting reservoir. The annular orifice is preferably defined by a gap of about 0.002 inch between the hardened face surface of the stator and the hardened rotor face having a diameter of about 5 inches. The hardened face surface of the stator preferably consists of chrome and the hardened rotor face preferably consists of stainless steel.

These features and advantages of the present invention as well as others will be more fully understood when the following description of one embodiment of the present invention is read in light of the accompanying drawings, in which:

FIG. 1 is an elevational view of a tension reel embodying the distributor of the present invention;

FIG. 2 is an enlarged elevational view of the distributor together with a piston and cylinder assembly shown in FIG. 1;

Figure 3:
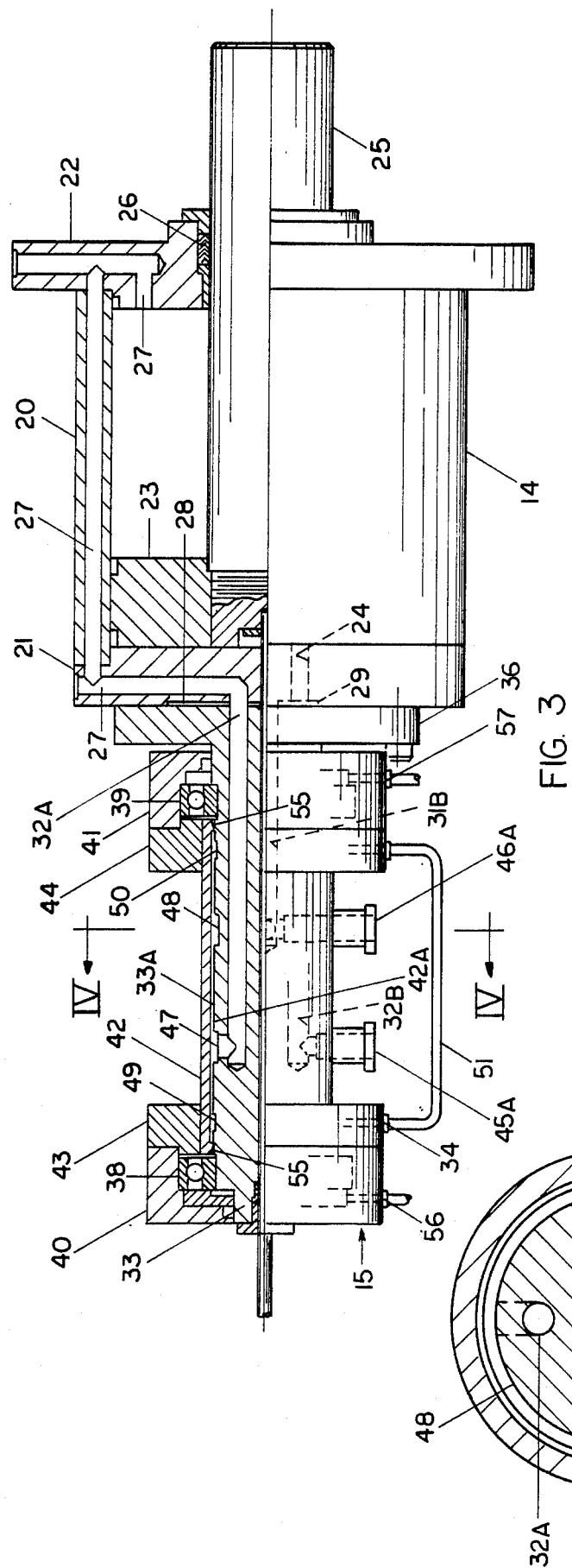
FIG. 3 is an enlarged elevational view, in section, of the apparatus shown in FIG. 2.
Figure 4:
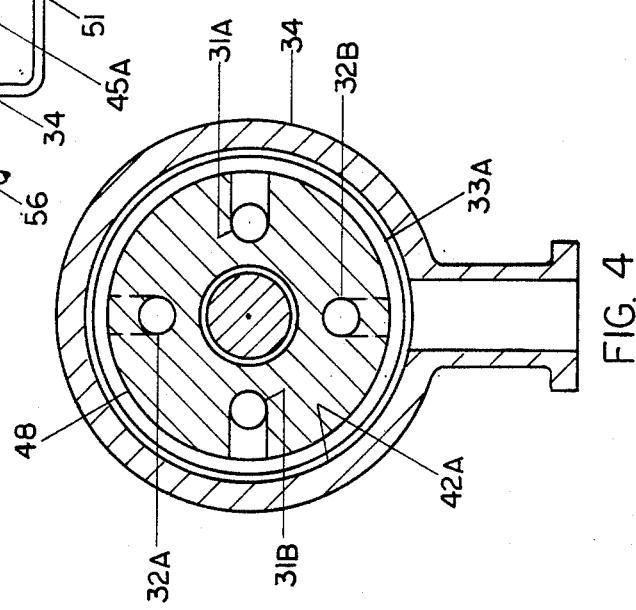
FIG. 4 is an enlarged view taken along line IV—IV of FIG. 3.

In FIG. 1, there is illustrated a tension or payoff reel 9 for coiling or uncoiling metal strip from coil form for processing in a rolling mill, strip processing line or the like. The reel includes an expandable mandrel 10 having segments 11 spaced about its outer periphery that can move radially outwardly and inwardly from a support arbor in a manner, per se, well known in the art. The mandrel is rotataly supported at one end by a drive housing 12 wherein the shaft of the mandrel is coupled to a drive pinion mounted on the end of a drive shaft 13. Drive shaft 13 is laterally offset from the rotational axis of the mandrel in the drive housing and the arbor shaft of the mandrel projects from the drive housing 12 above the drive shaft. A fluid-actuated piston and cylinder assembly 14 is secured to the projecting portion of the arbor shaft and rotates therewith. Assembly 14 is, in turn, connected to a distributor 15 embodying the features of the present invention. The distributor is supported by a bracket 16 extending from the drive housing 12. A piston and cylinder assembly 17 is supported by a base 18 and connected to the drive housing 12 to shift the mandrel in the direction of its rotational axis to control the lateral position of uncoiled strip.

As shown in FIG. 3, the piston and cylinder assembly 14 includes a cylindrical side wall 20 engaged with end walls 21 and 22 at opposite ends thereof. A piston 23 can slide along in the cylindrical side wall between the end walls. The piston is forced towards end wall 22 by the flow of a pressurized fluid medium through a passageway 24 in end wall 21. A piston rod 25 is connected to the piston 23 and moves through an opening in end wall 22 in a fluid-tight relation formed by a seal 26. The piston is forced in the opposite direction, i.e., towards end wall 21 by the flow of a pressurized fluid medium through a series of interconnected passageways 27 in end walls 21 and 22 and wall 20. The end of the piston rod is connected by a coupling device, not shown, to an actuating rod for the mandrel. As is well known in the art, the actuating rod of the mandrel can be moved back and forth along an opening in a mandrel shaft where, at the end thereof, a tie plate is joined to the actuating rod and to segments of the reel. Between the reel segments and the shaft of the reel, wedge surfaces are formed to radially move the segments 11.

End wall 21 has two enlarged recesses 28 and 29 that communicate with passageways 24 and 27, respectively, at the side of the plate which is opposite the face surface of the plate directed toward the piston. These recesses direct fluid from the passageways 24 and 27 separately to pairs of longitudinal bores 31A, 31B and 32A and 32B. These bores are formed in a rotor 33 that is supported to rotate within a stator 34 forming part of the distributor 15. An end flange section 36 is formed on the rotor and joined by threaded fasteners that extend into tapped holes in the end wall 21. As the mandrel rotates, the piston and cylinder assembly 14 also rotates as well as the rotor 33 which is bolted thereto. The stator, however, is supported by the bracket 16 (FIG. 1) that is, in turn, supported by the drive housing 12.

Anti-friction bearings 38 and 39 are supported in stator bearing housings 40 and 41 to carry the rotor at its proximal ends for rotation in a bore of a stator body 42. The stator body includes flanges 43 and 44 that support threaded fasteners which pass through suitable openings in the flanges and extend into tapped holes in the bearing housings 40 and 41. The bore in the stator body has a hardened face surface 42A that is preferably formed by a layer of chrome applied by plating techniques. Spaced from this surface by a distance of preferably 0.002 inch, when the bore 42A is about 5 inches, is a hardened cylindrical surface 33A preferably formed of a stainless steel overlay on a steel material used to form the rotor. The stainless steel overlay and the chromed surface on the rotor and stator, respectively, provide protection from erosion that might otherwise be caused by the flow of a fluid medium in the gap between these surfaces.

Means are provided for conducting a highly-pressurized supply of fluid medium that includes a pump connected through suitable piping, control valves and conduits 45 and 46 (FIG. 2) coupled to flanged ports of supply pipes 45A and 46A, respectively, that are welded or otherwise secured to openings in the wall of stator body 42. In FIG. 3, the flanged pipes are spaced apart by a distance that corresponds to the spacing of two annular reservoirs 47 and 48 formed by machined grooves in the stator body that communicate with the conduits 31A, 31B and 32A and 32B, respectively. A drain reservoir 49 is formed by a machined annular groove in the rotor at a site between the reservoir 47 and bearing 38. As shown in FIG. 3, the space between drain reservoir 49 and reservoir 47 is substantially smaller than the space between reservoirs 47 and 48 so that the fluid medium can flow from reservoir 47 to reservoir 49. In a similar way, a reservoir 50 is formed between reservoir 48 and bearing 39. The reservoirs 49 and 50 are interconnected by flow equalization pipes 51 (FIG. 2) that are joined with tapped holes in the stator flanges 43 and 44. Preferably, four flow equalization pipes are arranged about the periphery of the stator.

The flow equalization pipes insure a continuous small flow of fluid medium in the gap between the stator and the rotor for delivery to bearings 38 and 39 to lubricate the same. When a pressurized fluid medium is introduced in pipe 45A, the fluid medium fills reservoir 47 and flows along conduits 32A and 32B and thence into the cylinder 20 to displace the piston 23 and piston rod along the cylinder. Fluid is initially exhausted from the opposite end of the piston through conduits 31A and 31B of the distributor and thence through reservoir 48 and discharged from flanged pipes 46A. As the piston moves to a stationary location, the fluid medium no longer flows in the flanged pipes 46A. Because the fluid medium serves as a lubricant for bearings 38 and 39, the medium might no longer be supplied to bearing 38 from reservoir 49. To avoid possible damage to the bearing, some of the fluid medium supplied to reservoir 49 is delivered by the flow equalization pipes 51 to reservoir 50. The fluid medium in reservoirs 49 and 50 can pass through metering orifices comprising a continuation of the gap between the stator and the rotor to a discharge nozzle 55 formed by a chamfered surface on the stator bore. This insures a continued supply of the fluid medium for lubricating the bearings. The fluid medium is drained from the bearings by drain ports 56 and 57 in the stator bearing housings 40 and 41. As shown in FIG. 2, drain pipes 58 are coupled to the ports 56 and 57 and extend to a "Tee" having a drain line 59 for returning the fluid medium to a tank of the pump.

The annular gap between the stator and rotor establishes an annular orifice. The length of the annular orifice between reservoirs 47 and 48 is large in relation to the length of the annular orifice between reservoirs 47 and 49 and between reservois 48 and 50. The pressurized fluid medium does not flow between reservoirs 47 and 48 because of the long orifice length. As presently understood, this occurs because a laminar fluid film on surfaces 42A and 33A is bounded with a turbulent annular body of fluid in the gap therebetween which is so small so as to inhibit the flow of the fluid medium between the reservoirs even though the pressure differential of the medium in the reservoirs is great, e.g., 1500 psi. There may be a very small fluid flow between reservoirs 47 and 48 but this is useful for preventing a build-up of heat due to the friction on the fluid between surfaces 33A and 42A which rotate at a relative peripheral speed.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A distributor for a highly-pressurized fluid medium at pressures of up to 1500 psi including the combination of a drum-like rotor having separate longitudinal bores extending from one end along part of the length thereof, each longitudinal bore intersecting with one of longitudinally-spaced radial rotor bores for conducting a fluid medium, a stator defining a stator bore, said stator having a hardened face surface, means including spaced-apart and radially-extending portal openings communicating with said stator bore for conducting a fluid medium, bearing means supported by the stator at opposite ends of said stator bore for rotatably carrying said rotor so that the radial bores of the rotor move into a generally confronting relation with said portal openings for transferring fluid medium therebetween, said rotor having a hardened rotor face surface forming an annular orifice with the hardened face surface of said stator bore, and drain means for conducting the fluid medium from the annular orifice, said drain means including an annular drain reservoir at each of opposite ends of said annular orifice outwardly of said radial bores between said radial bores and said bearing means, each annular drain reservoir being closely spaced from an adjacent one of said radial bores such that the portion of said annular orifice extending between said radial bores is of sufficient length to substantially prevent the flow of said fluid medium therealong between said radial bores as compared with the lengths of portions of the annular orifices extending between each radial bore and an adjacent annular drain reservoir for continually delivering fluid medium to said drain means, said stator and rotor defining annular metering orifices between each of said bearing means and an adjacent one of said annular drain reservoirs for supplying a fluid medium to said bearing means for lubrication thereof.

2. The distributor according to claim 1 wherein said drain means further includes drain ports in said stator, each port communicating with one of said annular drain reservoirs.

3. The distributor according to claim 1 wherein said bearing means comprises anti-friction bearings.

4. The distributor according to claim 1 wherein said annular orifice is a gap of about 0.002 inch between the hardened face surface of the stator and the hardened rotor face.

5. The distributor according to claim 1 wherein the hardened face surface of said stator consists of chrome.

6. The distributor according to claim 1 wherein said hardened rotor face consists of stainless steel.

7. The distributor according to claim 1 further including flow equalization pipes interconnecting said annular drain reservoirs for continuously supplying fluid medium to said bearing means.

* * * * *